United States Patent [19]

Cretini

[11] Patent Number: 5,593,575
[45] Date of Patent: Jan. 14, 1997

[54] FLOATING COVER AND BAFFLE SYSTEM

[76] Inventor: Gus R. Cretini, 5920 Sevenoaks Ave., Baton Rouge, La. 70806

[21] Appl. No.: 227,522

[22] Filed: Apr. 14, 1994

[51] Int. Cl.$^6$ ........................................... C02F 3/30
[52] U.S. Cl. .................. 210/170; 210/242.2; 210/320
[58] Field of Search .................. 210/242.1, 747, 210/170, 242.2, 150, 151, 320, DIG. 9

[56] References Cited

U.S. PATENT DOCUMENTS

| | | | |
|---|---|---|---|
| 3,933,628 | 1/1976 | Varani | 210/170 |
| 4,169,791 | 10/1979 | Johnson, Jr. et al. | 210/170 |
| 4,209,388 | 6/1980 | DeFraites | 210/170 |
| 4,230,580 | 10/1980 | Dodson | 210/170 |
| 5,096,577 | 3/1992 | Ngo et al. | 210/242.1 |
| 5,256,281 | 10/1993 | Ngo et al. | 210/242.1 |

*Primary Examiner*—Thomas G. Wyse
*Attorney, Agent, or Firm*—Jesse D. Lambert

[57] ABSTRACT

A floating cover and baffle system used to vastly increase treatment effectiveness of wastewater treatment lagoons used to remove pollutants from water. The floating cover prevents direct sunlight penetration which prevents the growth of algae, while allowing air to flow between the cover and the surface of the lagoon to maximize oxygen transfer. The baffle system consist of several aerobic baffles and anaerobic baffles. The aerobic baffles are located perpendicular to the direction of flow of wastewater and directs the flow into the upper region of the lagoon which is where aerobic micro-organisms prevail and there is the most available oxygen. The baffles are also secured at a thirty degree angle with the bottom of the lagoon in order to minimizing solids settling and prevent the accumulation of solids in a concentrated area which can cause odor problems. The anaerobic baffles are very similar to the aerobic baffles except the flow is directed to the lower region of the lagoon which is where anaerobic micro-organisms prevail.

10 Claims, 2 Drawing Sheets

FLOATING COVER AND BAFFLE SYSTEM

BACKGROUND OF THE INVENTION

The present invention relates to a floating cover and baffle system used to vastly increase treatment effectiveness of wastewater treatment lagoons used to remove pollutants from water.

For many years, sewerage treatment facilities, as well as some industrial wastewater treatment facilities, have used lagoons to remove pollutants. However, as effluent water quality standards have become more strict, entities have either abandoned their lagoons as a mode of treatment or they have added tertiary treatment units. Those entities who have added tertiary treatment units such as constructed wetlands systems, sand filters, and spray irrigation, are plagued with algae problems which hamper the effectiveness of tertiary treatment units. Also, tertiary treatment units are being designed larger than necessary to allow for algae accumulation, and in many cases algae clogging problems eventually cause premature system failure. Although algae does exhibit positive effects on wastewater treatment lagoons, such as providing oxygen during daylight hours, there are many more negative effects. Other negative effects associated with algae growth in wastewater treatment lagoons include the way algae causes the pH of the water to rise. The micro-organisms which stabilize organic matter are extremely sensitive to pH and their effectiveness is severely reduced at high pH levels. Furthermore, permitted effluent quality limitations are often violated because the discharge of algae contributes to both biochemical oxygen demand and total suspended solids. The present invention will provide a cost effective way to prevent algae growth in wastewater treatment lagoons.

Those entities who employ mechanical wastewater treatment systems, such as the various types of activated sludge processes, are having a difficult time successfully operating and maintaining these systems due to the extremely high cost which include large amounts of electricity, sludge treatment and disposal, chlorination, dechlorination, the need for a highly knowledgeable wastewater treatment facility operator, and replacement of major components. Additionally, as wastewater collection systems age, inflow and or infiltration of rain water into collection systems play an increasing role in effective wastewater treatment. Small to medium sized mechanical wastewater treatment systems are typically unsuccessful in handling even moderate amounts of inflow and or infiltration, which results in solids being washed out of the aeration basin during and immediately after rainfall events. These so-called washouts are causing permit noncompliance and subsequent problems for government environmental regulatory agencies as well as the wastewater treatment entities themselves. The present invention will allow entities to return to using wastewater treatment lagoons, which can handle inflow and or infiltration, and do not include any of the above mentioned costs.

SUMMARY OF THE INVENTION

The present invention relates to a floating cover and baffle system used to vastly increase treatment effectiveness of wastewater treatment lagoons used to remove pollutants from water.

The floating cover consists of cover material held above the surface of the lagoon by floats. The cover material will prevent direct sunlight penetration and will be arranged in such a way as to allow air to flow between the cover material and the surface of the water, in order to maximize oxygen transfer. The prevention of direct sunlight prevents the growth of algae due to the absence of adequate photosynthesis needed for survival. As the algae is prevented to grow, the pH levels in the water will be maintained in a neutral range which will improve the effectiveness of the micro-organisms that stabilize organic matter.

The cover will also provide insulating qualities that will protect the lagoon from extreme summer and winter temperatures. In the summer, the cover will prevent the water temperature from increasing to very high levels, which reduce the oxygen saturation level in the water. Thus, a covered lagoon will have more available oxygen for the micro-organisms than an uncovered lagoon. In addition, a covered lagoon will improve mixing and reduce short circuiting by substantially preventing density stratification which is caused by high water temperatures near the surface. In the winter, the cover will help reduce the amount of heat leaving the lagoon and will help maintain the waters original temperature prior to entering the lagoon, while sheltering the surface of the water from extreme winter temperatures. Since the effectiveness of micro-organisms to stabilize organic matter is severely reduced at extremely cold temperatures, a covered lagoon will help increase their effectiveness by maintaining warmer water temperatures during the winter. Thus, the floating cover will keep the temperature of the water from being too hot during the summer and too cold during the winter.

The baffle system consists of several aerobic and anaerobic type angular baffles which increase mixing and reduce density stratification. An aerobic baffle is located perpendicular to the direction of flow and across the entire width of the lagoon. It also extends from the lagoon bottom to an elevation above the anaerobic zone of the lagoon. The baffle makes a thirty degree angle with the bottom of the lagoon in order to minimize solids settling and also to prevent accumulation of solids in a concentrated area. As the wastewater flows through the lagoon, the aerobic baffle directs the flow into the upper region of the lagoon which is where aerobic micro-organisms prevail and where there is the most available oxygen.

The anaerobic baffle is also located perpendicular to the direction of flow and across the entire width of the lagoon. However, it extends from the surface of the water to an elevation below the aerobic zone of the lagoon. This baffle makes a thirty degree angle with the surface of the water in order to minimize solids settling and prevent the accumulation of solids in a concentrated area. As the wastewater flows through the lagoon, the anaerobic baffle directs the flow into the lower region of the lagoon which is where anaerobic micro-organisms prevail.

It should be noted that the baffle system is used far enough from the discharge point where an adequate settling area is allowed.

The floating cover and baffle system has many applications ranging from domestic wastewater treatment, industrial wastewater treatment, agricultural wastewater treatment such as dairies and feed lots, and aquacultural wastewater treatment. It should also be noted that the present invention can be used with or without mechanical aeration.

BRIEF DESCRIPTION OF THE DRAWINGS

In the drawings wherein like reference numerals and letters indicate corresponding elements throughout the several views.

DETAILED DESCRIPTION OF PREFERRED EMBODIMENT

Floating Cover

Figure 1:
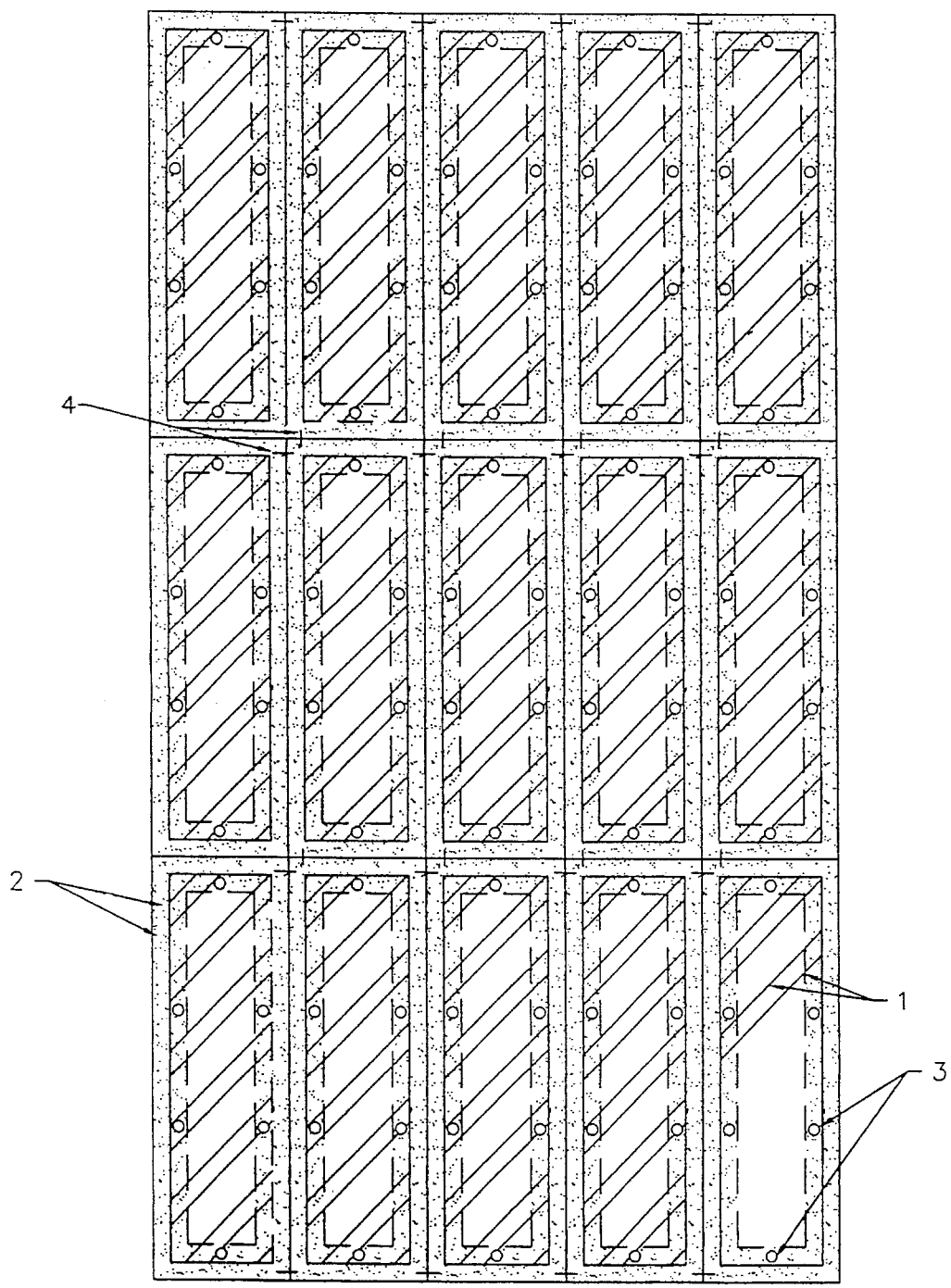
FIG. 1 is a top view of several floating cover units.

The preferred embodiment of the floating cover as shown in FIG. 1 consists of several individual floating units six feet wide by eighteen feet long which are bound together. Each unit consists of a sheet of cover material 1, preferably made of one quarter inch polyethylene, that is held above the surface of the lagoon by floats 2, preferably made of styrofoam®, six inches wide by six inches tall. The floats 2 completely surround the sheet of cover material 1 with one inch of float 2 overhanging all sides of the cover material 1. Spacers 3 are located between the floats 2 and the cover material 1 in order to allow air to flow between the cover and the surface of the lagoon. Each unit has spacers 3 one inch, and one and one half inches tall in order to slightly tilt each sheet of cover material 1 to aid rainfall drainage. The cover material 1, spacers 3, and floats 2 are bolted together.

The floating units can be pre-fabricated and shipped to the lagoon site. It should be noted that deployment of the floating cover and baffle system will require two floating water crafts. Units are placed in the water and aligned along the desired length of the lagoon you wish to cover until a column is formed, attaching each unit together using U-bolts 4. Then, a new column adjacent to the first is started and units are added until two adjacent columns are formed, securing each unit and each column together by using U-bolts 4. Continue to add units to form adjacent columns until you have covered the entire width of the lagoon. Units with custom made lengths and widths may be necessary to precisely cover the surface area of the lagoon.

Figure 2:
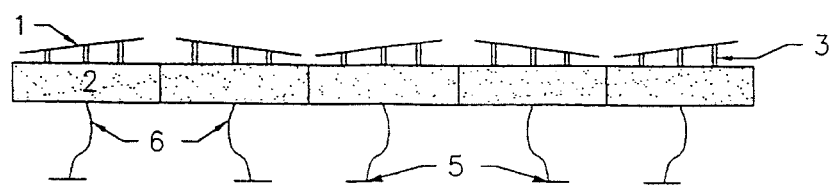
FIG. 2 is a cross-sectional front view of FIG. 1 wherein each floating unit facing the open water is anchored to a weight located on the pond floor.

If the floating cover is being used in a situation where the entire lagoon surface is not covered, such as to remove algae prior to a tertiary treatment unit or following mechanical aeration, the edge of each unit facing the open water shall be connected to a steel cable 6, shown in FIG. 2, which is attached to a twelve inch by twelve inch by one inch steel plate 5 located on the lagoon bottom, in order to anchor the cover during high winds. The cable 6 is long enough to allow for maximum water depth in the lagoon. When the entire lagoon surface is covered, only selected units throughout the lagoon will be anchored, since the lagoon levees will provide a certain degree of protection from high winds.

Aerobic Baffle

Figure 3:
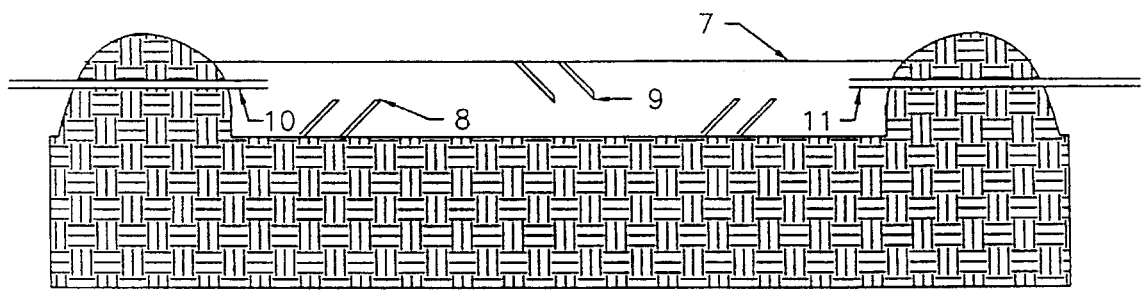
FIG. 3 is a cross-sectional side view of a typical wastewater treatment lagoon which has aerobic baffles and anaerobic baffles.
Figure 4:
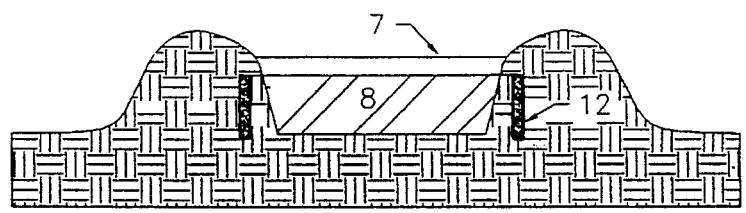
FIG. 4 is a cross-sectional front view of a typical wastewater treatment lagoon which has an aerobic baffle.

The aerobic baffle 8, shown in FIGS. 3 and 4, consists of a non-porous material, preferably made of one quarter inch polyethylene, which extends the entire width of the lagoon. The aerobic baffle 8 also extends from the bottom of the pond to an elevation of one foot below the pond surface. The aerobic baffle 8 is secured at a thirty degree angle with the bottom of the lagoon and directs the flow of wastewater into the upper region of the lagoon which is where aerobic micro-organisms prevail. Since polyethylene floats, all baffle sections are laid out end to end across the width of the lagoon and each sheet is overlapped by one inch and riveted together on each side by persons in two floating water crafts. The top side of the aerobic baffle 8 is secured to a cable by using O-shaped clamps which are attached around the cable and through pre-drilled holes in the top of the aerobic baffle 8. The cable is then stretched tight and fastened to anchored steel post 12 located on each side of the lagoon. When the cable is in place, the top of the aerobic baffle 8 is at an elevation of one foot below the surface of the water 7. Weights are then attached to the other side of the aerobic baffle 8 and that end is allowed to sink to the bottom. The aerobic baffle 8 is of adequate height to form approximately a thirty degree angle with the lagoon bottom when in its final position. The natural flow of the water over the aerobic baffle 8 will aid in keeping the bottom of the aerobic baffle 8 flush with the bottom of the lagoon.

Anaerobic Baffle

Figure 5:
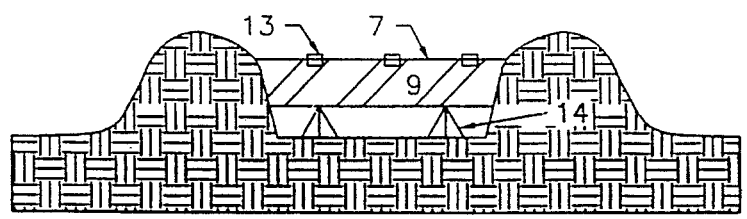
FIG. 5 is a cross-sectional front view of a typical wastewater treatment lagoon which has an anaerobic baffle.

The anaerobic baffle 9, shown in FIGS. 3 and 5, consists of a non-porous material, preferably made of one quarter inch polyethylene, which extends the entire width of the lagoon. The anaerobic baffle 9 also extends from the surface of the lagoon 7 to an elevation of one foot above the lagoon bottom. The anaerobic baffle 9 is secured at a thirty degree angle with the surface of the water and directs the flow of wastewater into the lower region of the lagoon which is where anaerobic micro-organisms prevail. Since polyethylene floats, all anaerobic baffle sections are laid out end to end across the width of the lagoon and each sheet is overlapped by one inch and riveted together on each side by persons in two floating water crafts. Then pyramid-shaped steel braces 14 are fastened to one side of the anaerobic baffle 9 and that side is allowed to sink the bottom. The steel pyramid braces 14 hold the bottom of the anaerobic baffle 9 one foot off the bottom of the lagoon and prevents the bottom part of the anaerobic baffle 9 from floating. Small floats 13 are then fastened to the top end of the anaerobic baffle 9 in order to keep this end at the lagoon surface 7. The height of the anaerobic baffle 9 will be such that a thirty degree angle will be made with the surface of the lagoon 7 when in its final position. The floating units located above the anaerobic baffle 9 will have twelve inch long and three inch deep grooves cut out of the bottom of the floats 2 in order to insure the anaerobic baffle 9 floats high enough to prevent any water from flowing over the anaerobic baffle 9.

What is claimed is:

1. A wastewater treatment lagoon baffle system comprising:

a wastewater treatment lagoon having a bottom and sides, said lagoon having a wastewater inlet and outlet forming a direction of wastewater flow therebetween, said lagoon containing wastewater with a surface and a total depth generally divided into a lower substantially anaerobic zone and an upper substantially aerobic zone;

one or more aerobic baffles of a material substantially impermeable to liquid flow having a generally rectangular sheetlike shape with upper and lower edges, said aerobic baffles fixed in said wastewater and spanning said wastewater lagoon in a direction transverse to said direction of wastewater flow, said lower edges of said aerobic baffles sealingly contacting said lagoon bottom, said aerobic baffles extending upward from said lagoon bottom with said upper edges of said aerobic baffles at a height above said substantially anaerobic zone, said aerobic baffles forming an angle to an upward vertical plane;

fastening means for fixing said aerobic baffles in position;

one or more anaerobic baffles of a material substantially impermeable to liquid flow having a generally rectangular sheetlike shape with upper and lower edges, said anaerobic baffles fixed in said wastewater and spanning said wastewater lagoon in a direction transverse to the direction of wastewater flow, said upper edges of said anaerobic baffles fixed at said wastewater surface, said anaerobic baffles extending downward from said wastewater surface with said lower edges of said anaerobic baffles fixed at a depth below said substantially aerobic zone, said anaerobic baffles forming an angle to an upward vertical plane; and fastening means for fixing said anaerobic baffles in position.

2. The baffle system of claim 1, wherein said upper edges of said aerobic baffles and said lower edges of said anaerobic baffles are inclined in said direction of wastewater flow.

3. The baffle system of claim 2, wherein said angle of said aerobic baffles from said upward vertical plane is 60 degrees and said angle of said anaerobic baffles from said upward vertical plane is 120 degrees.

4. A wastewater treatment system comprising:

a wastewater treatment lagoon having a bottom and sides, said lagoon having a wastewater inlet and outlet forming a direction of wastewater flow therebetween, said lagoon containing wastewater with a surface and a total depth generally divided into a lower substantially anaerobic zone and an upper substantially aerobic zone;

one or more aerobic baffles of a material substantially impermeable to liquid flow having a generally rectangular sheetlike shape with upper and lower edges, said aerobic baffles fixed in said wastewater and spanning said wastewater lagoon in a direction transverse to said direction of wastewater flow, said lower edges of said aerobic baffles sealingly contacting said lagoon bottom, said aerobic baffles extending upward from said lagoon bottom with said upper edges of said aerobic baffles at a height above said substantially anaerobic zone, said aerobic baffles forming an angle to an upward vertical plane;

fastening means for fixing said aerobic baffles in position;

one or more anaerobic baffles of a material substantially impermeable to liquid flow having a generally rectangular sheetlike shape with upper and lower edges, said anaerobic baffles fixed in said wastewater and spanning said wastewater lagoon in a direction transverse to the direction of wastewater flow, said upper edges of said anaerobic baffles fixed at said wastewater surface, said anaerobic baffles extending downward from said wastewater surface with said lower edges of said anaerobic baffles fixed at a depth below said substantially aerobic zone, said anaerobic baffles forming an angle to an upward vertical plane;

fastening means for fixing said anaerobic baffles in position;

cover material of substantially opaque sheeting supported substantially horizontally above at least part of said surface of said wastewater;

one or more buoyant floats disposed upon said wastewater surface supporting said cover material a desired ventilation distance above said wastewater surface; and means for securing said cover material to said floats.

5. The wastewater treatment system of claim 4, wherein said upper edges of said aerobic baffles and said lower edges of said anaerobic baffles are inclined in said direction of wastewater flow.

6. The wastewater treatment system of claim 5, wherein said angle of said aerobic baffles from said upward vertical plane is 60 degrees and said angle of said anaerobic baffles from said upward vertical plane is 120 degrees.

7. The wastewater treatment system of claim 4, wherein said cover material is supported at an angle to said wastewater surface.

8. The wastewater treatment system of claim 4, wherein the geometric shape of said buoyant floats is that of an open rectangle having a substantially rectangular window therethrough.

9. The wastewater treatment system of claim 8, wherein said cover material is of a generally rectangular shape at least the size of said rectangular window of said floats thereby completely covering said window.

10. The wastewater treatment system of claim 4, further comprising a restraining means for restricting lateral movement of said cover and said floats on said wastewater surface.

* * * * *